(12) United States Patent
Amano et al.

(10) Patent No.: US 10,816,759 B2
(45) Date of Patent: Oct. 27, 2020

(54) IMAGING LENS AND OPTICAL APPARATUS

(71) Applicant: NANCHANG O-FILM OPTICAL-ELECTRONIC TECH CO., LTD., Nanchang (CN)

(72) Inventors: Masaru Amano, Saitama (JP); Masao Mori, Saitama (JP); Taro Asami, Saitama (JP); Kazuyoshi Okada, Saitama (JP)

(73) Assignee: NANCHANG O-FILM OPTICAL-ELECTRONIC TECH CO., LTD., Nanchang (CN)

( * ) Notice: Subject to any disclaimer, the term of this patent is extended or adjusted under 35 U.S.C. 154(b) by 120 days.

(21) Appl. No.: 16/131,116

(22) Filed: Sep. 14, 2018

(65) Prior Publication Data
US 2019/0094495 A1 Mar. 28, 2019

(30) Foreign Application Priority Data
Sep. 25, 2017 (JP) .................. 2017-183863

(51) Int. Cl.
*G02B 27/00* (2006.01)
*G02B 9/64* (2006.01)
(52) U.S. Cl.
CPC .......... *G02B 9/64* (2013.01); *G02B 27/0037* (2013.01); *G02B 27/0062* (2013.01)
(58) Field of Classification Search
CPC ...... G02B 27/00; G02B 9/64; G02B 27/0037; G02B 27/0062; G02B 13/00; G02B 13/04; G02B 15/177; G02B 13/0045; G02B 27/0025; G02B 15/173; G02B 7/008; G02B 15/10; G02B 15/167; G02B 15/20; G02B 7/02
See application file for complete search history.

(56) References Cited

U.S. PATENT DOCUMENTS

| | | | | |
|---|---|---|---|---|
| 4,384,766 A | * | 5/1983 | Tokuhara | G02B 9/36 359/732 |
| 6,154,323 A | * | 11/2000 | Kamo | G02B 27/0037 359/691 |
| 6,157,495 A | * | 12/2000 | Kawasaki | G02B 15/173 359/686 |

(Continued)

FOREIGN PATENT DOCUMENTS

JP   H08-297244 A   11/1996

OTHER PUBLICATIONS

Ohara, S-LAL20, May 2017, https://www.oharacorp.com/pdf/s-lal20.pdf (Year: 2017).*

(Continued)

*Primary Examiner* — Balram T Parbadia
(74) *Attorney, Agent, or Firm* — Platinum Intellectual Property LLP

(57) ABSTRACT

The imaging lens includes at least one positive lens that satisfies predetermined conditional expressions (1) to (3) indicating conditions in which dispersion is relatively low and refractive index is high while having a negative rate of change of the refractive index. In a case where a lens that satisfies a conditional expression (4) meaning a low dispersion material is included, the lens that satisfies the conditional expression (4) satisfies a predetermined conditional expression (5).

15 Claims, 11 Drawing Sheets

EXAMPLE 1

(56) References Cited

U.S. PATENT DOCUMENTS

| | | | |
|---|---|---|---|
| 2003/0156335 A1* | 8/2003 | Takatsuki | G02B 13/04 359/753 |
| 2008/0231962 A1* | 9/2008 | Yamada | G02B 15/177 359/649 |
| 2009/0185282 A1* | 7/2009 | Ishibashi | G02B 15/177 359/687 |
| 2013/0003189 A1* | 1/2013 | Sanjo | G02B 7/008 359/686 |
| 2014/0118849 A1* | 5/2014 | Mori | G02B 9/04 359/715 |
| 2015/0015966 A1* | 1/2015 | Ida | G02B 13/04 359/680 |
| 2015/0130961 A1* | 5/2015 | Sudoh | H04N 5/23296 348/220.1 |
| 2015/0237265 A1* | 8/2015 | Sudoh | G02B 15/173 348/240.3 |
| 2015/0260968 A1* | 9/2015 | Ohashi | G02B 15/24 348/143 |
| 2016/0004046 A1* | 1/2016 | Asami | G02B 13/18 359/713 |
| 2017/0351050 A1* | 12/2017 | Sugita | G02B 7/008 |

OTHER PUBLICATIONS

Ohara, S-LAL54Q, May 2017, https://www.oharacorp.com/pdf/S-LAL54Q.pdf (Year: 2017).*

* cited by examiner

EXAMPLE 1

EXAMPLE 2

EXAMPLE 3

EXAMPLE 4

IMAGING LENS AND OPTICAL APPARATUS

CROSS REFERENCE TO RELATED APPLICATIONS

The present application claims priority under 35 U.S.C. § 119 to Japanese Patent Application No. 2017-183863 filed on Sep. 25, 2017. The above application is hereby expressly incorporated by reference, in its entirety, into the present application.

BACKGROUND OF THE INVENTION

1. Field of the Invention

The present invention relates to an imaging lens suitable for an in-vehicle camera, a digital camera or the like, and an optical apparatus including this imaging lens.

2. Description of the Related Art

As imaging lenses suitable for an optical apparatus such as a digital camera, imaging lenses disclosed in, for example, JP1996-297244A (JP-H08-297244A) have been known.

SUMMARY OF THE INVENTION

It is important to suppress chromatic aberration in order to realize a high-definition imaging lens, and a material having great abnormal dispersibility is effective in correcting a secondary spectrum of chromatic aberration. Since a material having great abnormal dispersibility has a large change in refractive index with respect to a change in temperature, there is proposed an imaging lens having an achievement of the correction of defocusing due to a change in temperature together with chromatic aberration by using this material. In JP1996-297244A (JP-H08-297244A), the correction of defocusing due to a change in temperature is achieved using a material having great abnormal dispersibility. However, since such a material is high-priced, it is not possible to respond to a request for a reduction in cost which is required for current imaging lenses.

The present invention has been contrived in view of such circumstances, and an object thereof is to provide an imaging lens which is inexpensive in cost, and in which chromatic aberration and defocusing due to a change in temperature are satisfactorily corrected, and an optical apparatus including this imaging lens.

According to the present invention, there is provided an imaging lens in which a plurality of lenses are combined with each other, comprising: at least one positive lens that satisfies the following Conditional Expressions (1) to (3) in a case where a refractive index at a d line of a positive lens included in the imaging lens is set to nP, an Abbe number at the d line of the positive lens is set to vP, and a rate of change of the refractive index at the d line of the positive lens with respect to a change in temperature at 25° C. is set to dnP/dt, wherein in a case where a lens that satisfies the following Conditional Expression (4) is included, the lens that satisfies the following Conditional Expression (4) satisfies the following Conditional Expression (5) in a case where an Abbe number at the d line of a lens included in the imaging lens is set to vd, and a partial dispersion ratio of the lens included in the imaging lens is set to θgF.

$$1.65 < nP < 1.75 \tag{1}$$

$$45 < vP < 55 \tag{2}$$

$$dnP/dt < 0 \times 10^{-6}/° \text{ C.} \tag{3}$$

$$60 < vd \tag{4}$$

$$0.6 < \theta gF + 0.001618 \times vd < 0.644 \tag{5}$$

Meanwhile, it is preferable that the positive lens that satisfies Conditional Expressions (1) to (3) further satisfies at least one of Conditional Expressions (1-1), (2-1), and (3-1).

$$1.69 < nP < 1.71 \tag{1-1}$$

$$50 < vP < 52 \tag{2-1}$$

$$-2 \times 10^{-6}/° \text{ C.} < dnP/dt < -1 \times 10^{-6}/° \text{ C.} \tag{3-1}$$

In addition, Conditional Expression (4-1) may be satisfied instead of Conditional Expression (4).

$$60 < vd < 75 \tag{4-1}$$

In the imaging lens of the present invention, in a case where a focal length of the positive lens is set to fP, and a focal length of the whole system during focusing on an infinite object is set to f, the positive lens that satisfies Conditional Expressions (1) to (3) preferably satisfies the following Conditional Expression (6), and more preferably satisfies the following Conditional Expression (6-1). Meanwhile, in a case where positive lenses are cemented, it is assumed that the front and back of the positive lenses are calculated as air.

$$1 < fP/f < 15 \tag{6}$$

$$1.2 < fP/f < 12 \tag{6-1}$$

In addition, it is preferable to include at least one negative lens that satisfies the following Conditional Expressions (7) to (9) in a case where a refractive index at the d line of a negative lens included in the imaging lens is set to nN, an Abbe number at the d line of the negative lens is set to vN, and a rate of change of the refractive index at the d line of the negative lens with respect to a change in temperature at 25° C. is set to dnN/dt.

$$1.6 < nN < 1.85 \tag{7}$$

$$40 < vN < 60 \tag{8}$$

$$6 \times 10^{-6}/° \text{ C.} < dnN/dt \tag{9}$$

Here, it is preferable that the negative lens that satisfies Conditional Expressions (7) to (9) further satisfies at least one of Conditional Expressions (7-1), (8-1), and (9-1).

$$1.65 < nN < 1.8 \tag{7-1}$$

$$42 < vN < 57 \tag{8-1}$$

$$6.5 \times 10^{-6}/° \text{ C.} < dnN/dt < 11 \times 10^{-6}/° \text{ C.} \tag{9-1}$$

In addition, in a case where a focal length of the negative lens is set to fN, and a focal length of the whole system during focusing on an infinite object is set to f, the negative lens that satisfies Conditional Expressions (7) to (9) preferably satisfy the following Conditional Expression (10), and more preferably satisfies the following Conditional Expression (10-1). Meanwhile, in a case where negative lenses are cemented, it is assumed that the front and back of the negative lenses are calculated as air.

$$-10 < fN/f < -0.5 \tag{10}$$

$$-7 < fN/f < -1 \tag{10-1}$$

In addition, it is preferable to satisfy the following Conditional Expression (11), and more preferable to satisfy the following Conditional Expression (11-1) in a case where a maximum value of heights of a paraxial on-axis light ray on each lens surface of the positive lens that satisfies Conditional Expressions (1) to (3) is set to HP, and a maximum value of heights of a paraxial on-axis light ray on each lens surface of all lenses included in the imaging lens is set to Hmax.

$$0.5 < |HP/Hmax| \quad (11)$$

$$0.65 < |Hp/Hmax| \leq 1 \quad (11\text{-}1)$$

According to the present invention, there is provided an optical apparatus comprising the above-described imaging lens of the present invention.

Meanwhile, the term "consist of ~" is intended to be allowed to include a lens having substantially no refractive power, optical elements, other than a lens, such as a stop, a mask, cover glass, or a filter, mechanism portions such as a lens flange, a lens barrel, an imaging element, or a camera-shake correction mechanism, and the like, in addition to the things enumerated as elements.

In addition, the surface shape, the sign of the refractive power, and the curvature radius of the lens are assumed to be those in a paraxial region in a case where an aspherical surface is included.

In addition, the partial dispersion ratio $\theta gF$ is represented by the following expression in a case where a refractive index at a g line (a wavelength of 435.8 nm) is set to ng, a refractive index at an F line (a wavelength of 486.1 nm) is set to nF, and a refractive index at a C line (a wavelength of 656.3 nm) is set to nC.

$$\theta gF = (ng - nF)/(nF - nC)$$

In addition, the height of a paraxial on-axis light ray is based on a definition in paraxial light ray tracing according to Expressions (2.10) to (2.12), pp. 19 of "Optical Technology Series 1 Lens Design Method" (authored by Yoshiya Matsui, Kyoritsu Shuppan Co., Ltd.).

According to the present invention, there is provided an imaging lens in which a plurality of lenses are combined with each other, comprising: at least one positive lens that satisfies the following Conditional Expressions (1) to (3) in a case where a refractive index at a d line of a positive lens included in the imaging lens is set to nP, an Abbe number at the d line of the positive lens is set to $\nu$P, and a rate of change of the refractive index at the d line of the positive lens with respect to a change in temperature at 25° C. is set to dnP/dt, wherein in a case where a lens that satisfies the following Conditional Expression (4) is included, the lens that satisfies the following Conditional Expression (4) satisfies the following Conditional Expression (5) in a case where an Abbe number at the d line of a lens included in the imaging lens is set to $\nu$d, and a partial dispersion ratio of the lens included in the imaging lens is set to $\theta gF$. Therefore, it is possible to provide an imaging lens which is inexpensive in cost, and in which chromatic aberration and defocusing due to a change in temperature are satisfactorily corrected, and an optical apparatus including this imaging lens.

$$1.65 < nP < 1.75 \quad (1)$$

$$45 < \nu P < 55 \quad (2)$$

$$dnP/dt < 0 \times 10^{-6}/°\text{ C.} \quad (3)$$

$$60 < \nu d \quad (4)$$

$$0.6 < \theta gF + 0.001618 \times \nu d < 0.644 \quad (5)$$

DESCRIPTION OF THE PREFERRED EMBODIMENTS

Figure 1:
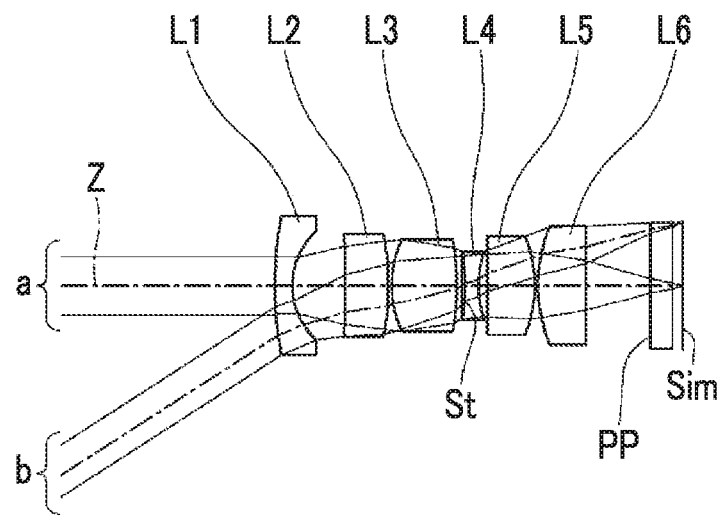
FIG. 1 is a cross-sectional view illustrating a lens configuration of an imaging lens (in common with that of Example 1) according to an embodiment of the present invention.

Hereinafter, an embodiment of the present invention will be described in detail with reference to the accompanying drawings. FIG. 1 is a cross-sectional view illustrating a lens configuration of an imaging lens according to an embodiment of the present invention. The configuration example shown in FIG. 1 is in common with the configuration of an imaging lens of Example 1 described later. In FIG. 1, the left side is an object side, the right side is an image side, and a shown aperture stop St shows its position on the optical axis Z without necessarily indicating its size or shape. In addition, FIG. 1 shows a state of being focused on the infinite object, and shows an on-axis light flux a and a light flux b of the maximum angle of view together.

Meanwhile, in a case where the imaging lens is mounted in an optical apparatus, it is preferable to include various types of filters and/or protective cover glass according to the specification of the optical apparatus. Thus, in FIG. 1, an example is shown in which a plane parallel plate-like optical member PP oriented to these components is disposed between a lens system and an image surface Sim. However, the position of the optical member PP is not limited to that shown in FIG. 1, and a configuration can also be used in which the optical member PP is omitted.

According to the present embodiment, there is provided an imaging lens in which a plurality of lenses are combined with each other, comprising: at least one positive lens that satisfies the following Conditional Expressions (1) to (3) in a case where a refractive index at a d line of a positive lens included in the imaging lens is set to nP, an Abbe number at the d line of the positive lens is set to νP, and a rate of change of the refractive index at the d line of the positive lens with respect to a change in temperature at 25° C. is set to dnP/dt, wherein in a case where a lens that satisfies the following Conditional Expression (4) is included, the lens that satisfies the following Conditional Expression (4) satisfies the following Conditional Expression (5) in a case where an Abbe number at the d line of a lens included in the imaging lens is set to νd, and a partial dispersion ratio of the lens included in the imaging lens is set to θgF.

$$1.65 < nP < 1.75 \tag{1}$$

$$45 < \nu P < 55 \tag{2}$$

$$dnP/dt < 0 \times 10^{-6}/° \text{C}. \tag{3}$$

$$60 < \nu d \tag{4}$$

$$0.6 < \theta gF + 0.001618 \times \nu d < 0.644 \tag{5}$$

Since a material generally having low dispersion and great abnormal dispersibility has a large value with a negative change in refractive index with respect to a change in temperature, using a lot of these materials causes an increase in defocusing due to a change in temperature. Particularly, in a case where a lot of materials having great abnormal dispersibility are used in a positive lens, correction with respect to a change in temperature tends to be in excess (plus). On the contrary, in a case of a lens system formed of only a material having little abnormal dispersibility, correction with respect to a change in temperature tends to be in deficiency (minus). Using a material having great abnormal dispersibility in a positive lens of a lens system deficient in correction makes it possible to perform temperature correction, which leads to an undesirable result in the sense of a reduction in cost.

Consequently, in the imaging lens of the present embodiment, at least one positive lens that satisfies Conditional Expressions (1) to (3) is disposed. The positive lens that satisfies Conditional Expressions (1) to (3) refers to a positive lens in which dispersion is relatively low and refractive index is high while having a negative rate of change of the refractive index. However, since a lot of optical materials have a positive rate of change of refractive index, the positive lens that satisfies Conditional Expressions (1) to (3) and a lens formed of other general optical materials are combined with each other, and thus it is possible to satisfactorily correct chromatic aberration and defocusing due to a change in temperature.

In addition, in a case where a lens that satisfies Conditional Expression (4) is included, the lens that satisfies Conditional Expression (4) is assumed to satisfy Conditional Expression (5). This means that a high-priced optical material having low dispersion and great abnormal dispersibility is not used. Thereby, it is possible to make an imaging lens inexpensive.

The value (nP) is not set to be equal to or less than the lower limit of Conditional Expression (1), and thus it is possible to prevent the refractive index from becoming excessively weak, and to secure a refractive power enough to obtain a temperature correction effect. The value (nP) is not set to be equal to or greater than the upper limit of Conditional Expression (1), and thus it is possible to prevent the refractive index from excessively increasing, and to secure an Abbe number required for chromatic aberration correction. Meanwhile, in a case where Conditional Expression (1-1) is satisfied, it is possible to make characteristics more satisfactory.

$$1.69 < nP < 1.71 \tag{1-1}$$

The value (νN) is not set to be equal to or less than the lower limit of Conditional Expression (2), which leads to the advantage of the correction of lateral chromatic aberration and on-axis chromatic aberration. The value (νN) is not set to be equal to or greater than the upper limit of Conditional Expression (2), which leads to the advantage of both the chromatic aberration correction and the refractive index. Meanwhile, in a case where Conditional Expression (2-1) is satisfied, it is possible to make characteristics more satisfactory.

$$50 < \nu P < 52 \tag{2-1}$$

The value (dnP/dt) is not set to be equal to or less than the lower limit of Conditional Expression (3), and thus it is possible to prevent a change in refractive index with respect to a change in temperature from excessively increasing, and to prevent the correction of defocusing from being in excess. The value (dnP/dt) is not set to be equal to or greater than the upper limit of Conditional Expression (3), and thus it is possible to maintain the rate of change in refractive index to be in a negative state. Thereby, it is possible to correct defocusing due to a change in temperature by combination with a lens formed of a general optical material. Meanwhile, in a case where Conditional Expression (3-1) is satisfied, it is possible to make characteristics more satisfactory.

$$-2 \times 10^{-6}/° \text{C}. < dnP/dt < -1 \times 10^{-6}/° \text{C}. \tag{3-1}$$

Conditional Expression (4) means a low dispersion material. Meanwhile, Conditional Expression (4-1) may be satisfied instead of Conditional Expression (4). The value (νd) is not set to be equal to or greater than the upper limit of Conditional Expression (4), and thus it is not necessary to use a high-priced material, which leads to the advantage of a reduction in cost.

$$60 < \nu d < 75 \tag{4-1}$$

Regarding the lens that satisfies Conditional Expression (4), the value (θgF+0.001618×νd) is not set to be equal to or less than the lower limit of Conditional Expression (5), and thus it is possible to prevent the abnormal dispersibility from excessively decreasing, which leads to the facilitation of the correction of a secondary spectrum. The value (θgF+0.001618×νd) is not set to be equal to or greater than the upper limit of Conditional Expression (5), and thus it is possible to prevent the abnormal dispersibility from excessively increasing. Thereby, it is not necessary to use a high-priced optical material, which leads to the advantage of a reduction in cost.

In the imaging lens of the present embodiment, it is preferable that the positive lens that satisfies Conditional Expressions (1) to (3) satisfies the following Conditional Expression (6) in a case where a focal length of the positive lens is set to fP, and a focal length of the whole system during focusing on an infinite object is set to f. The value (fP/f) is not set to be equal to or less than the lower limit of Conditional Expression (6), and thus it is possible to prevent the refractive power of the positive lens from becoming excessively strong, and to prevent the temperature correction effect from excessively increasing. The value (fP/f) is not set to be equal to or greater than the upper limit of Conditional Expression (6), and thus it is possible to prevent the refractive power of the positive lens from becoming excessively weak, and to prevent the temperature correction effect from excessively decreasing. Meanwhile, in a case where Conditional Expression (6-1) is satisfied, it is possible to make characteristics more satisfactory.

$$1 < fP/f < 15 \quad (6)$$

$$1.2 < fP/f < 12 \quad (6\text{-}1)$$

In addition, it is preferable to include at least one negative lens that satisfies the following Conditional Expressions (7) to (9) in a case where a refractive index at the d line of a negative lens included in the imaging lens is set to nN, an Abbe number at the d line of the negative lens is set to vN, and a rate of change of the refractive index at the d line of the negative lens with respect to a change in temperature at 25° C. is set to dnN/dt. The negative lens that satisfies Conditional Expressions (7) to (9) refers to a negative lens which is suitable for the correction of chromatic aberration and has a positive rate of change of refractive index. As described above, in the imaging lens of the present embodiment, since the positive lens that satisfies Conditional Expressions (1) to (3), that is, the positive lens having a negative rate of change of refractive index is included, it is possible to satisfactorily correct chromatic aberration and defocusing due to a change in temperature by the combination of the negative lens that satisfies Conditional Expressions (7) to (9).

$$1.6 < nN < 1.85 \quad (7)$$

$$40 < vN < 60 \quad (8)$$

$$6 \times 10^{-6}/° \text{ C.} < dnN/dt \quad (9)$$

The value (nN) is not set to be equal to or less than the lower limit of Conditional Expression (7), and thus it is possible to prevent the refractive index from excessively decreasing, and to secure a refractive power for obtaining the temperature correction effect. The value (nN) is not set to be equal to or greater than the upper limit of Conditional Expression (7), and thus it is possible to prevent the refractive index from excessively increasing, and to secure an Abbe number required for chromatic aberration correction. Meanwhile, in a case where Conditional Expression (7-1) is satisfied, it is possible to make characteristics more satisfactory.

$$1.65 < nN < 1.8 \quad (7\text{-}1)$$

The value (vN) is not set to be equal to or less than the lower limit of Conditional Expression (8), which leads to the advantage of the correction of lateral chromatic aberration and on-axis chromatic aberration. The value (vN) is not set to be equal to or greater than the upper limit of Conditional Expression (8), which leads to the advantage of both the chromatic aberration correction and the refractive index. Meanwhile, in a case where Conditional Expression (8-1) is satisfied, it is possible to make characteristics more satisfactory.

$$42 < vN < 57 \quad (8\text{-}1)$$

The value (dnN/dt) is not set to be equal to or less than the lower limit of Conditional Expression (9), and thus it is possible to prevent a change in refractive index with respect to a change in temperature from excessively decreasing, and to prevent the correction of defocusing from being in deficiency. The value (dnN/dt) is not set to be equal to or greater than the upper limit of Conditional Expression (9), and thus it is possible to prevent a change in refractive index with respect to a change in temperature from excessively increasing, and to prevent the correction of defocusing from being in excess. Meanwhile, in a case where Conditional Expression (9-1) is satisfied, it is possible to make characteristics more satisfactory.

$$6.5 \times 10^{-6}/° \text{ C.} < dnN/dt < 11 \times 10^{-6}/° \text{ C.} \quad (9\text{-}1)$$

In addition, it is preferable that the negative lens that satisfies Conditional Expressions (7) to (9) satisfies the following Conditional Expression (10) in a case where a focal length of the negative lens is set to fN, and a focal length of the whole system during focusing on an infinite object is set to f. The value (fN/f) is not set to be equal to or less than the lower limit of Conditional Expression (10), and thus it is possible to prevent the refractive power of the negative lens that satisfies Conditional Expressions (7) to (9) from becoming excessively weak, and to prevent the temperature correction effect from excessively decreasing. The value (fN/f) is not set to be equal to or greater than the upper limit of Conditional Expression (10), and thus it is possible to prevent the refractive power of the negative lens that satisfies Conditional Expressions (7) to (9) from becoming excessively strong, and to prevent the temperature correction effect from excessively increasing. Meanwhile, in a case where Conditional Expression (10-1) is satisfied, it is possible to make characteristics more satisfactory.

$$-10 < fN/f < -0.5 \quad (10)$$

$$-7 < fN/f < -1 \quad (10\text{-}1)$$

In addition, it is preferable to satisfy the following Conditional Expression (11) in a case where a maximum value of heights of a paraxial on-axis light ray on each lens surface of the positive lens that satisfies Conditional Expressions (1) to (3) is set to HP, and a maximum value of heights of a paraxial on-axis light ray on each lens surface of all lenses included in the imaging lens is set to Hmax. The value (|Hp/Hmax|) is not set to be equal to or less than the lower limit of Conditional Expression (11), and thus it is possible to prevent the height of a paraxial on-axis light ray of the positive lens that satisfies Conditional Expressions (1) to (3) from becoming excessively small, and to prevent a correction effect with respect to a change in temperature from becoming excessively weak. Meanwhile, in a case where Conditional Expression (11-1) is satisfied, it is possible to make characteristics more satisfactory.

$$0.5 < |HP/H\text{max}| \quad (11)$$

$$0.65 < |Hp/H\text{max}| \leq 1 \quad (11\text{-}1)$$

In addition, in the example shown in FIG. 1, an example is shown in which the optical member PP is disposed between the lens system and the image surface Sim, but instead of disposing various types of filters, such as a low-pass filter or a filter in which a specific wavelength region is cut, between the lens system and the image surface Sim, various types of filters described above may be disposed between respective lenses, or coating having the same actions as those of various types of filters may be performed on the lens surface of any of the lenses.

Next, numerical value examples of imaging lenses of the present invention will be described. First, an imaging lens of Example 1 will be described. FIG. 1 shows a cross-sectional view illustrating a lens configuration of the imaging lens of Example 1. In FIG. 1 and FIGS. 2 to 6 corresponding to Example 2 to 6 described later, the left side is an object side, the right side is an image side, and a shown aperture stop St shows its position on the optical axis Z without necessarily indicating its size or shape. In addition, FIGS. 1 to 6 show states of being focused on an infinite object. In addition, FIG. 1 only shows an on-axis light flux a and a light flux b of the maximum angle of view together.

The imaging lens of Example 1 is composed of six lenses, that is, lenses L1 to L6 in order from the object side. In the imaging lens of Example 1, the lens L6 (its material is S-LAL20 manufactured by OHARA INC.) is a positive lens that satisfies Conditional Expressions (1) to (3), and the lens L1 (its material is S-LAL54Q manufactured by OHARA INC.) is a negative lens that satisfies Conditional Expressions (7) to (9).

Table 1 shows basic lens data of the imaging lens of Example 1, and Table 2 shows data relating to specifications. In the following, the meanings of symbols in the tables will be described by taking an example of those in Example 1, but the same is basically true of Examples 2 to 6.

In the lens data of Table 1, the column of a surface number shows surface numbers sequentially increasing toward the image surface side with the surface of an element closest to the object side regarded as a first surface and, the column of a curvature radius shows curvature radii of respective surfaces, and the column of a surface distance shows distances on the optical axis Z between the respective surfaces and the next surfaces. In addition, the column of n shows refractive indexes of respective optical elements at the d line (a wavelength of 587.6 nm (nanometer)), the column of ν shows Abbe numbers of the respective optical elements at the d line (a wavelength of 587.6 nm (nanometer)), the column of dn/dt shows rates of change in refractive index at the d line (a wavelength of 587.6 nm (nanometer)) with respect to a change in temperature at 25° C. of the respective optical elements, the column of θgF shows partial dispersion ratios of the respective optical elements, and the column of Conditional Expression (5) shows values of Conditional Expression (5) of the respective optical elements. Meanwhile, in Table 1, "×10$^{-6}$/° C." is omitted with respect to the values of dn/dt.

In addition, the sign of the curvature radius is set to be positive in a case where a surface shape is convex on the object side, and is set to be negative in a case where a surface shape is convex on the image surface side. Basic lens data indicates the aperture stop St and optical member PP together. In the place of a surface number of a surface equivalent to the aperture stop St, a term of (stop) is written together with the surface number.

The data relating to specifications of Table 2 shows values of a focal length f, a back focus Bf, an F-Number FNo., and the total angle of view 2ω[°].

For the basic lens data and the data relating to specifications, a degree (°) is used as the unit of an angle, and mm (millimeter) is used as the unit of a length, but it is also possible to use other appropriate units since an optical system can be used even in a case where the optical system is magnified or reduced in proportion.

TABLE 1

Example 1·Lens Data (n and ν are based on d LINE)

| Surface Number | Curvature Radius | Surface Distance | n | ν | dn/dt | θgF | Conditional Expression (5) |
|---|---|---|---|---|---|---|---|
| 1 | 18.4995 | 0.8000 | 1.65100 | 56.24 | 6.6 | 0.54210 | 0.63310 |
| 2 | 3.6028 | 2.4528 | | | | | |
| 3 | −76.9928 | 1.9551 | 1.83481 | 42.72 | 4.6 | 0.56486 | 0.63398 |
| 4 | −13.1166 | 0.1500 | | | | | |
| 5 | 5.4057 | 3.0000 | 2.00100 | 29.13 | 4.0 | 0.59952 | 0.64665 |
| 6 | −13.9521 | 0.2000 | | | | | |
| 7 (Stop) | ∞ | 0.2000 | | | | | |
| 8 | −9.2839 | 0.6000 | 2.10420 | 17.02 | 9.6 | 0.66311 | 0.69065 |
| 9 | 4.8094 | 0.4200 | | | | | |
| 10 | ∞ | 2.2000 | 1.88300 | 40.76 | 4.8 | 0.56679 | 0.63274 |
| 11 | −6.2340 | 0.1500 | | | | | |
| 12 | 7.6932 | 2.2102 | 1.69930 | 51.11 | −1.2 | 0.55523 | 0.63793 |
| 13 | ∞ | 3.0000 | | | | | |
| 14 | ∞ | 1.0000 | 1.51680 | 64.20 | 2.7 | 0.53430 | 0.63818 |
| 15 | ∞ | 0.4946 | | | | | |

TABLE 2

| Example 1·Specification (d LINE) | |
|---|---|
| f | 5.03 |
| Bf | 4.15 |
| FNo. | 1.80 |
| 2ω[°] | 66.8 |

Figure 7:
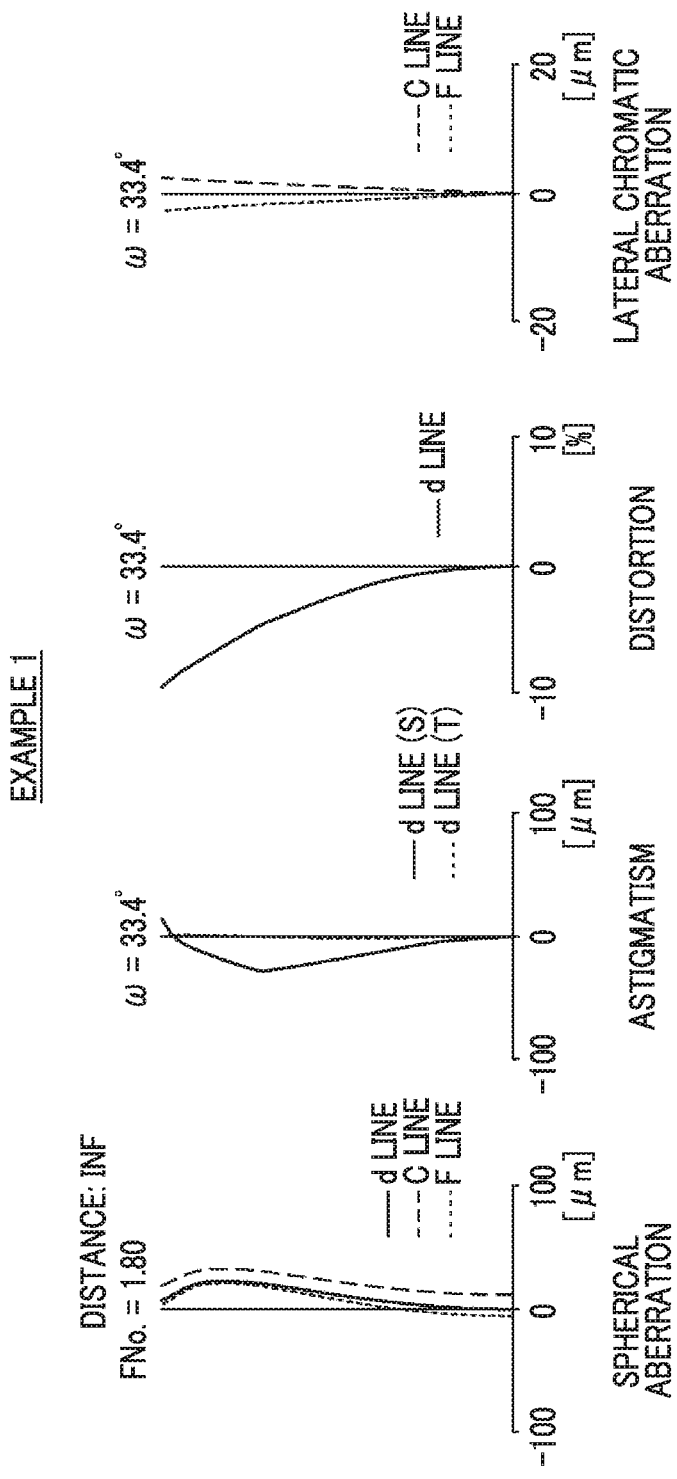
FIG. 7 is a diagram of aberrations of the imaging lens of Example 1 of the present invention.

FIG. 7 shows a diagram of aberrations of the imaging lens of Example 1. Meanwhile, spherical aberration, astigmatism, distortion, and lateral chromatic aberration are shown in order from the left side in FIG. 7. The diagram of aberrations indicating spherical aberration, astigmatism, and distortion shows aberrations in which the d line (a wavelength of 587.6 nm (nanometer)) is used as a reference wavelength. In the spherical aberration diagram, aberrations relating to the d line (a wavelength of 587.6 nm (nanometer)), a C line (a wavelength of 656.3 nm (nanometer)), and an F line (a wavelength of 486.1 nm (nanometer)) are shown by a solid line, a long dashed line, and a short dashed line. In the astigmatism diagram, aberrations in a sagittal direction and a tangential direction are shown by a solid line and a short dashed line, respectively. In the lateral chromatic aberration diagram, aberrations relating to the C line (a wavelength of 656.3 nm (nanometer)) and the F line (a wavelength of 486.1 nm (nanometer)) are shown by a long dashed line and a short dashed line, respectively. Meanwhile, FNo. in the spherical aberration diagram means an F-Number, and ω in the other aberration diagrams means a half angle of view.

Figure 2:
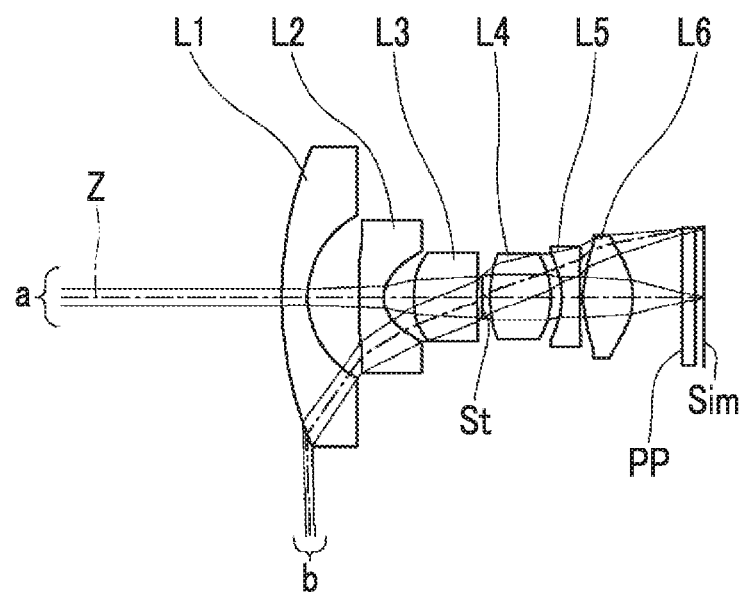
FIG. 2 is a cross-sectional view illustrating a lens configuration of an imaging lens of Example 2 of the present invention.
Figure 8:
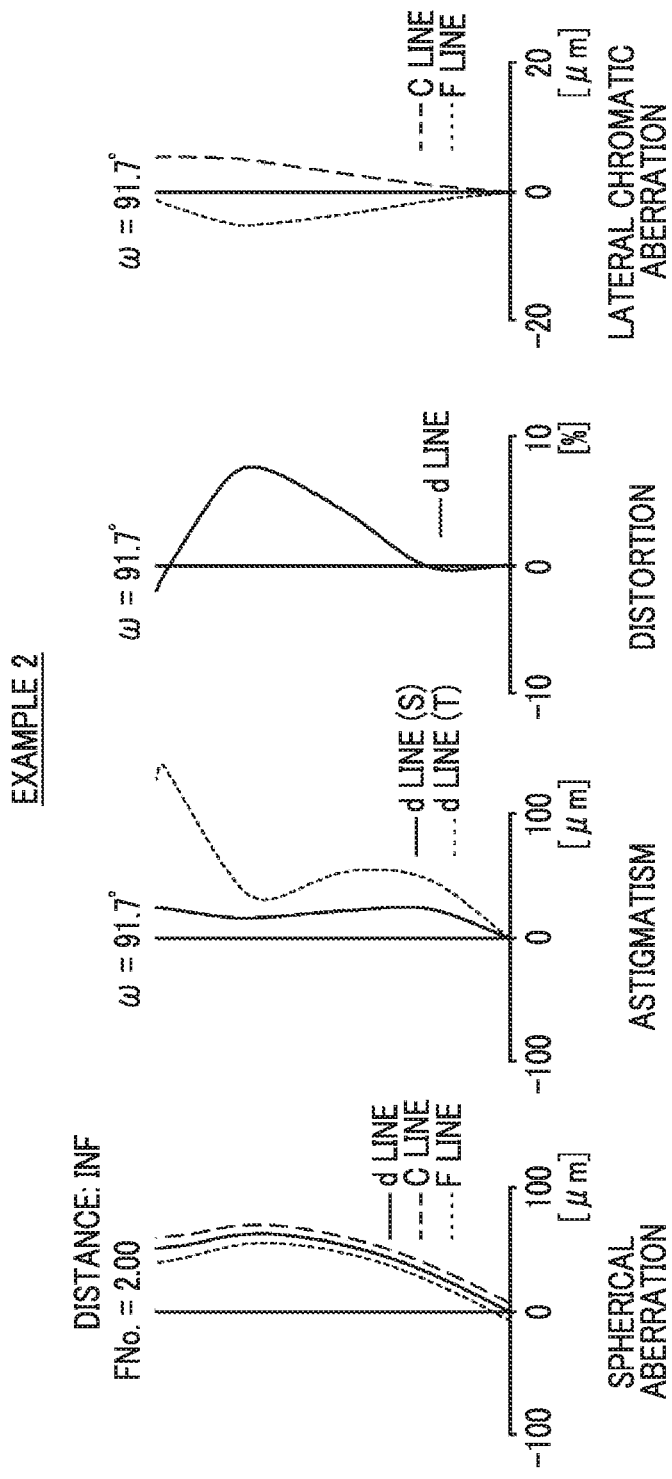
FIG. 8 is a diagram of aberrations of the imaging lens of Example 2 of the present invention.

Next, an imaging lens of Example 2 will be described. FIG. 2 shows a cross-sectional view illustrating a lens configuration of the imaging lens of Example 2. The imaging lens of Example 2 is composed of six lenses, that is, lenses L1 to L6 in order from the object side. In the imaging lens of Example 2, the lens L4 (its material is S-LAL20 manufactured by OHARA INC.) is a positive lens that satisfies Conditional Expressions (1) to (3), and the lens L1 (its material is S-LAL54Q manufactured by OHARA INC.) is a negative lens that satisfies Conditional Expressions (7) to (9). In addition, Table 3 shows basic lens data of the imaging lens of Example 2, Table 4 shows data relating to specifications, Table 5 shows data relating to aspherical coefficients, and FIG. 8 shows a diagram of aberrations.

In the lens data of Table 3, mark * is attached to the surface number of an aspherical surface, and the numerical values of a paraxial curvature radius are indicated as the curvature radius of the aspherical surface. The data relating to the aspherical coefficients of Table 5 indicates surface numbers of the aspherical surfaces and aspherical coefficients relating to these aspherical surfaces. "E±n" (n is an integer) in the numerical values of the aspherical coefficients of Table 5 means "×10$^{±n}$". The aspherical coefficients are values of respective coefficients KA and Am in an aspherical expression represented by the following expression. Meanwhile, the meanings of symbols in the data relating to aspherical coefficients will be described by taking an example of those in Example 2, but the same is basically true of Examples 3 to 6.

$$Zd = C \cdot h^2 / \{1 + (1 - KA \cdot C^2 \cdot h^2)^{1/2}\} + \Sigma Am \cdot h^m$$

Here, Zd is an aspherical depth (length of a vertical line drawn from a point on an aspherical surface having a height h down to a plane perpendicular to the optical axis with which the vertex of the aspherical surface is in contact),
h is a height (distance from the optical axis),
C is a reciprocal of the paraxial curvature radius,
KA and Am are aspherical coefficients, and
Σ at an aspherical depth Zd means a total sum for m.

TABLE 3

Example 2•Lens Data (n and ν are based on d LINE)

| Surface Number | Curvature Radius | Surface Distance | n | ν | dn/dt | θgF | Conditional Expression (5) |
|---|---|---|---|---|---|---|---|
| 1 | 17.1579 | 1.1000 | 1.65100 | 56.24 | 6.6 | 0.54210 | 0.63310 |
| 2 | 4.0278 | 2.2001 | | | | | |
| *3 | −11.4543 | 1.0400 | 1.53391 | 55.89 | −91.9 | 0.56064 | 0.65107 |
| *4 | 2.0013 | 1.2211 | | | | | |
| *5 | 4.4624 | 2.7000 | 1.63360 | 23.61 | −113.3 | 0.61679 | 0.65499 |
| *6 | 32.1704 | 0.2501 | | | | | |
| 7 (Stop) | ∞ | 0.3000 | | | | | |
| 8 | 5.2146 | 2.6500 | 1.69930 | 51.11 | −1.2 | 0.55523 | 0.63793 |
| 9 | −3.5420 | 0.4415 | | | | | |
| 10 | −4.1239 | 0.7762 | 1.92286 | 18.90 | 1.9 | 0.64960 | 0.68018 |
| 11 | 124.6974 | 0.1501 | | | | | |
| *12 | 4.6091 | 2.1334 | 1.53391 | 55.89 | −91.9 | 0.56064 | 0.65107 |
| *13 | −2.6323 | 2.0700 | | | | | |
| 14 | ∞ | 0.5500 | 1.51680 | 64.20 | 2.7 | 0.53430 | 0.63818 |
| 15 | ∞ | 0.4043 | | | | | |

TABLE 4

Example 2•Specification (d LINE)

| | |
|---|---|
| f | 1.51 |
| Bf | 2.84 |
| FNo. | 2.00 |
| 2ω[°] | 183.4 |

TABLE 5

Example 2•Aspherical Coefficient

| | Surface Number | | | | | |
|---|---|---|---|---|---|---|
| | 3 | 4 | 5 | 6 | 12 | 13 |
| KA | 0.0000000E+00 | 0.0000000E+00 | 0.0000000E+00 | 0.0000000E+00 | 0.0000000E+00 | 0.0000000E+00 |
| A3 | 3.8626789E−02 | 7.2877414E−02 | −6.3389016E−03 | −3.3429652E−04 | −3.6783201E−04 | −8.9195702E−03 |
| A4 | −7.8941572E−04 | −2.7275531E−02 | 1.7145981E−02 | 1.2560302E−02 | −8.7729743E−03 | 1.5758422E−02 |
| A5 | −1.2152650E−03 | 2.1263056E−02 | 1.7346347E−03 | 1.0690126E−02 | 3.5786694E−04 | −1.7322146E−03 |
| A6 | −3.3501970E−04 | 7.7116045E−03 | 1.1753534E−03 | −3.7822093E−02 | 4.7886604E−04 | −8.9085204E−04 |
| A7 | −4.9976039E−05 | −2.8237411E−04 | 3.6761507E−04 | 3.4368545E−02 | 1.0803541E−04 | −1.9317911E−05 |
| A8 | −6.2733584E−07 | −1.4714506E−03 | −2.2506329E−04 | 1.3117287E−02 | 8.4646416E−06 | 7.6949315E−05 |
| A9 | 4.8982776E−06 | −5.2891044E−04 | −3.2761871E−04 | 2.8109279E−05 | −5.5518564E−06 | 3.3995349E−05 |
| A10 | 7.4719158E−07 | −2.7699400E−04 | −2.8538246E−05 | −2.2817830E−02 | −4.0515129E−06 | 6.5533539E−06 |
| A11 | 4.9101882E−07 | −4.3547647E−05 | 3.0300905E−05 | −2.5862075E−02 | −1.3295822E−06 | −1.2662888E−06 |
| A12 | 1.5192576E−08 | 2.8701333E−05 | 5.7031701E−05 | 1.7266556E−02 | −3.0919705E−07 | −1.3314327E−06 |
| A13 | −1.5078382E−08 | 2.6955476E−05 | −6.0522422E−06 | −1.2078498E−02 | −4.8799489E−08 | −5.0699022E−07 |
| A14 | −5.4324864E−09 | −8.2384982E−07 | −4.7906078E−07 | 8.5440195E−02 | −1.7837518E−08 | −6.5858678E−08 |

TABLE 5-continued

Example 2・Aspherical Coefficient

| | Surface Number | | | | | |
|---|---|---|---|---|---|---|
| | 3 | 4 | 5 | 6 | 12 | 13 |
| A15 | −6.2106880E−10 | 3.7328967E−06 | −1.5695062E−06 | −7.0761741E−02 | −7.6036402E−09 | 5.8871092E−08 |
| A16 | −3.1173015E−10 | −1.2182004E−06 | −9.6187082E−07 | −3.5665497E−02 | 2.3961784E−09 | 5.7023978E−08 |
| A17 | −2.0093662E−11 | 2.7131203E−07 | −6.8527487E−07 | 1.2146095E−01 | 4.5950559E−09 | −2.5249132E−08 |
| A18 | 3.2329070E−11 | −3.6877944E−08 | 1.2211354E−07 | −1.1263775E−01 | 2.6716619E−09 | 9.5145023E−09 |
| A19 | 7.1399201E−12 | −5.6822415E−08 | 1.5633436E−07 | 3.8303629E−02 | −4.5327456E−10 | −5.7185738E−09 |
| A20 | −1.8076197E−12 | −7.9845463E−09 | −1.8261236E−08 | −1.4002241E−03 | −2.9385724E−10 | 1.1230508E−09 |

Figure 3:
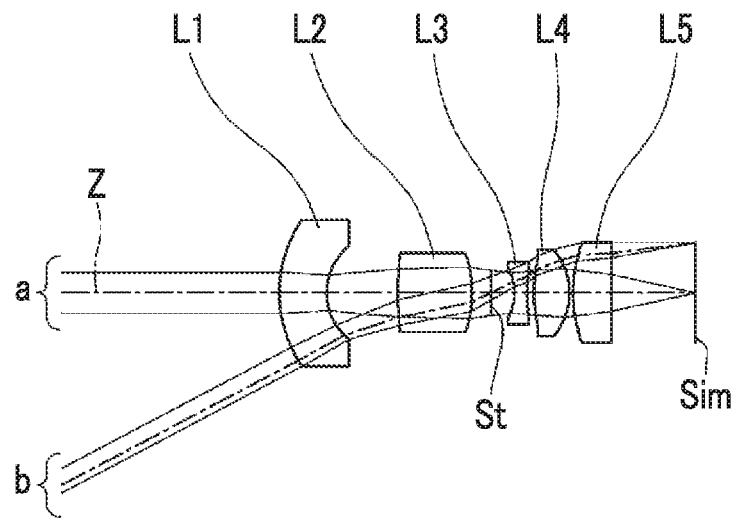
FIG. 3 is a cross-sectional view illustrating a lens configuration of an imaging lens of Example 3 of the present invention.
Figure 9:
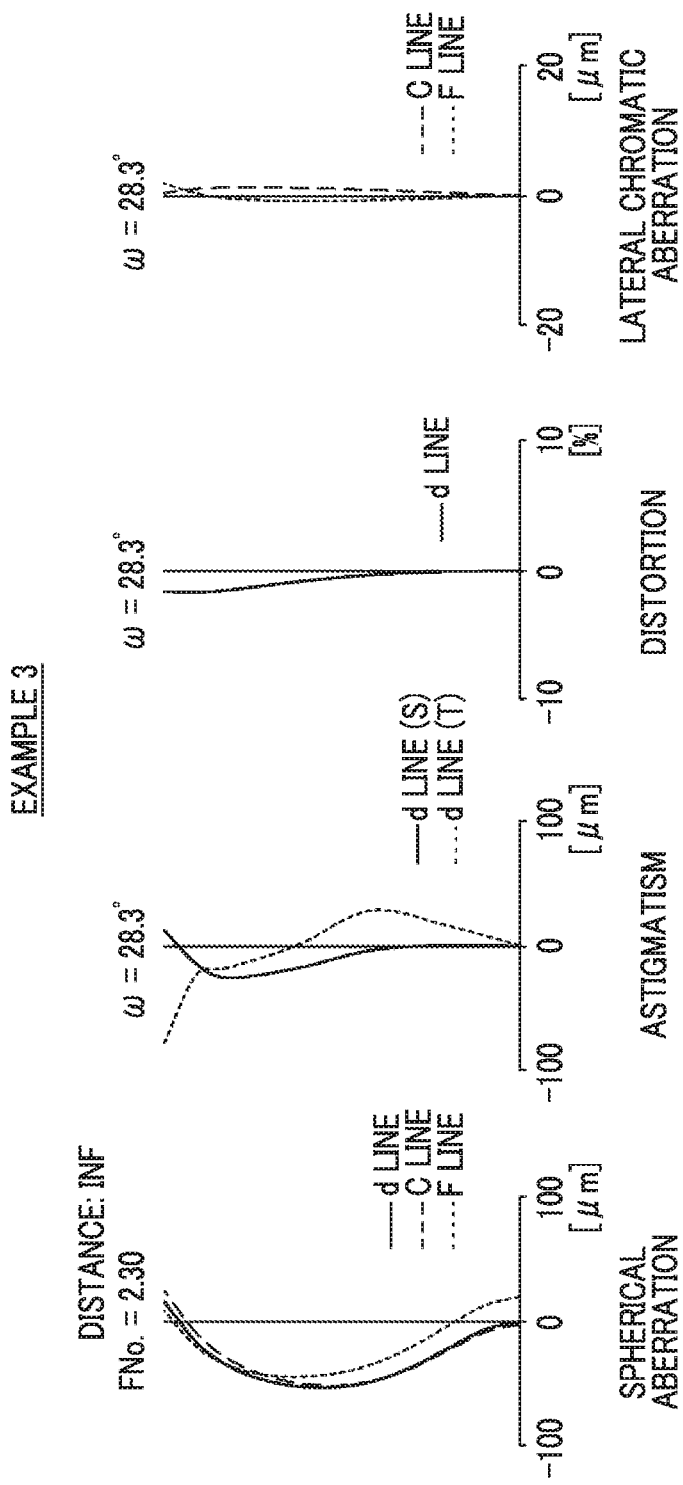
FIG. 9 is a diagram of aberrations of the imaging lens of Example 3 of the present invention.

Next, an imaging lens of Example 3 will be described. FIG. 3 shows a cross-sectional view illustrating a lens configuration of the imaging lens of Example 3. The imaging lens of Example 3 is composed of five lenses, that is, lenses L1 to L5 in order from the object side. In the imaging lens of Example 3, the lens L5 (its material is S-LAL20 manufactured by OHARA INC.) is a positive lens that satisfies Conditional Expressions (1) to (3), and the lens L1 (its material is S-LAL54Q manufactured by OHARA INC.) is a negative lens that satisfies Conditional Expressions (7) to (9). In addition, Table 6 shows basic lens data of the imaging lens of Example 3, Table 7 shows data relating to specifications, Table 8 data relating to aspherical coefficients, and FIG. 9 shows a diagram of aberrations.

TABLE 6

Example 3・Lens Data (n and ν are based on d LINE)

| Surface Number | Curvature Radius | Surface Distance | n | ν | dn/dt | θgF | Conditional Expression (5) |
|---|---|---|---|---|---|---|---|
| 1 | 7.9900 | 2.7595 | 1.65100 | 56.24 | 6.6 | 0.54210 | 0.63310 |
| 2 | 3.6532 | 4.1086 | | | | | |
| 3 | 22.0301 | 4.3424 | 1.83481 | 42.72 | 4.6 | 0.56486 | 0.63398 |
| 4 | −7.3388 | 1.0927 | | | | | |
| 5 (Stop) | ∞ | 1.3650 | | | | | |
| *6 | −3.7526 | 0.7501 | 1.63367 | 23.82 | −113.3 | 0.62908 | 0.66762 |
| *7 | 4.8091 | 0.4002 | | | | | |
| *8 | 4.7339 | 2.1000 | 1.53112 | 55.30 | −90.0 | 0.55145 | 0.64093 |
| *9 | −3.8190 | 0.2000 | | | | | |
| 10 | 8.8446 | 2.2162 | 1.69930 | 51.11 | −1.2 | 0.55523 | 0.63793 |
| 11 | 77.4201 | 4.9403 | | | | | |

TABLE 7

Example 3・Specification (d LINE)

| | |
|---|---|
| f | 5.66 |
| Bf | 4.94 |
| FNo. | 2.30 |
| 2ω[°] | 56.6 |

TABLE 8

Example 3・Aspherical Coefficient

| | Surface Number | | | |
|---|---|---|---|---|
| | 6 | 7 | 8 | 9 |
| KA | 2.8409878E+00 | −4.5088224E+00 | −4.8289277E+00 | 1.1494151E−01 |
| A3 | 0.0000000E+00 | 0.0000000E+00 | 0.0000000E+00 | 0.0000000E+00 |
| A4 | −9.1703722E−04 | −3.1850805E−02 | −1.6137484E−02 | 2.1437873E−04 |
| A5 | −1.9376229E−02 | −7.2724912E−03 | 0.0000000E+00 | 0.0000000E+00 |
| A6 | 9.0887541E−03 | 1.2629474E−02 | 2.2691205E−03 | −3.3032942E−04 |
| A7 | 8.0889028E−03 | 7.9050198E−04 | 0.0000000E+00 | 0.0000000E+00 |
| A8 | −4.3817221E−03 | −2.2165421E−03 | −1.4816108E−04 | 3.0806623E−05 |
| A9 | −7.4314296E−04 | −1.6387262E−05 | 0.0000000E+00 | 0.0000000E+00 |
| A10 | 4.6909964E−04 | 1.4078055E−04 | 0.0000000E+00 | 0.0000000E+00 |

Figure 4:
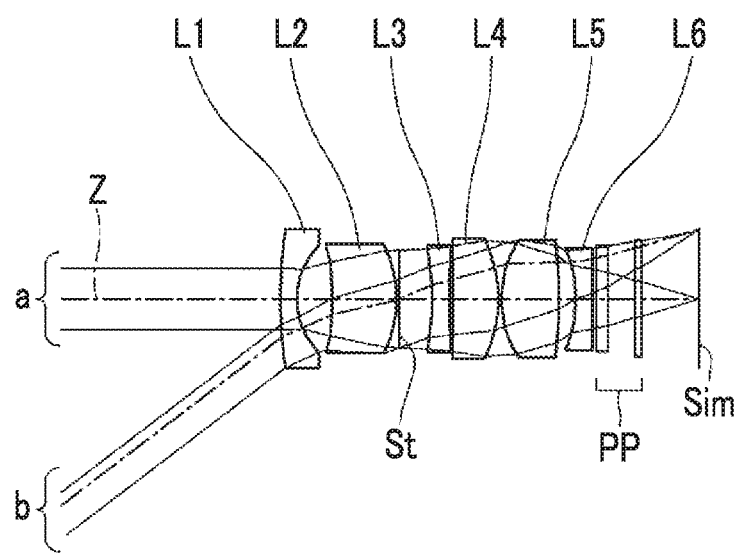
FIG. 4 is a cross-sectional view illustrating a lens configuration of an imaging lens of Example 4 of the present invention.
Figure 10:
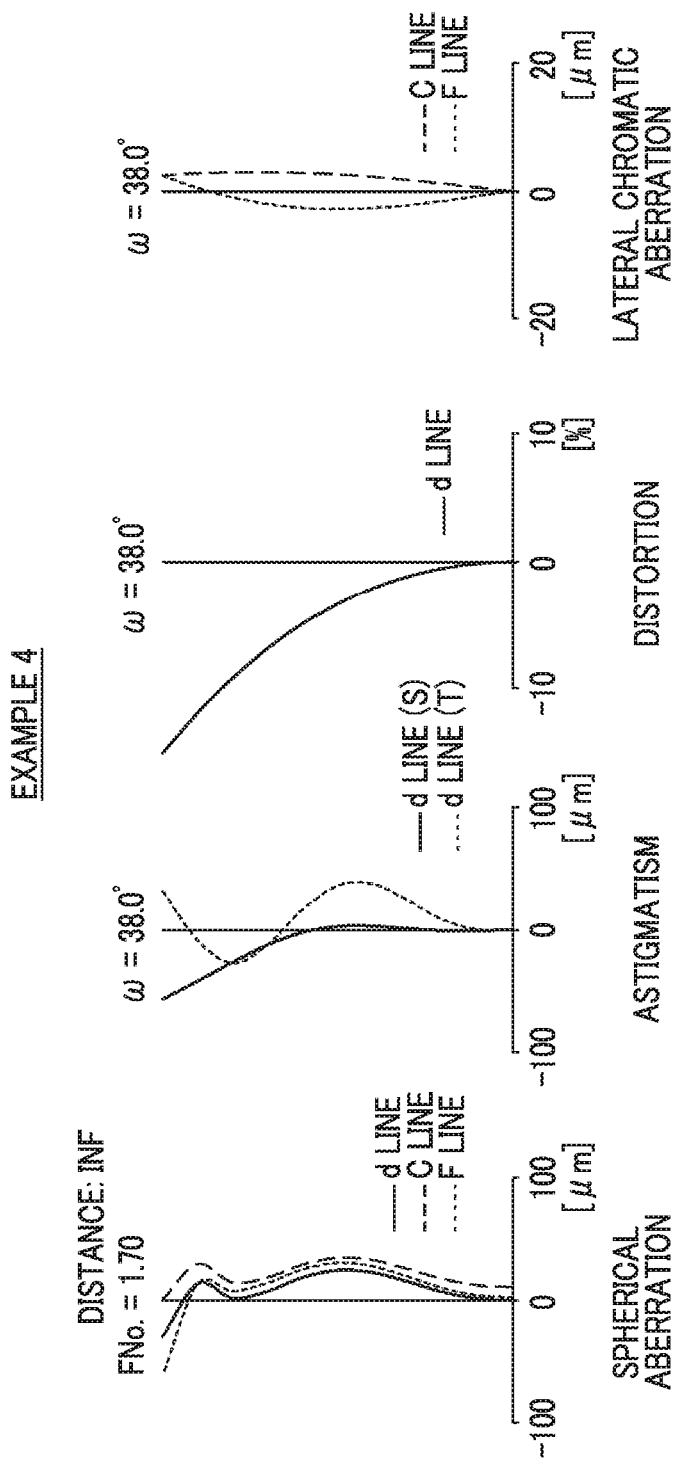
FIG. 10 is a diagram of aberrations of the imaging lens of Example 4 of the present invention.

Next, an imaging lens of Example 4 will be described. FIG. 4 shows a cross-sectional view illustrating a lens configuration of the imaging lens of Example 4. The imaging lens of Example 4 is composed of six lenses, that is, lenses L1 to L6 in order from the object side. In the imaging lens of Example 4, the lens L5 (its material is S-LAL20 manufactured by OHARA INC.) is a positive lens that satisfies Conditional Expressions (1) to (3), and the lens L1 (its material is S-LAL54Q manufactured by OHARA INC.) is a negative lens that satisfies Conditional Expressions (7) to (9). In addition, Table 9 shows basic lens data of the imaging lens of Example 4, Table 10 shows data relating to specifications, Table 11 shows data relating to aspherical coefficients, and FIG. 10 shows a diagram of aberrations.

TABLE 9

Example 4•Lens Data (n and ν are based on d LINE)

| Surface Number | Curvature Radius | Surface Distance | n | ν | dn/dt | θgF | Conditional Expression (5) |
|---|---|---|---|---|---|---|---|
| 1 | 29.7901 | 1.0001 | 1.65100 | 56.24 | 6.6 | 0.54210 | 0.63310 |
| 2 | 4.7612 | 2.1449 | | | | | |
| *3 | −35.5377 | 3.8675 | 1.80625 | 40.91 | 7.9 | 0.56920 | 0.63539 |
| *4 | −8.3501 | 0.2000 | | | | | |
| 5 (Stop) | ∞ | 1.9688 | | | | | |
| 6 | −19.3711 | 1.1000 | 1.92286 | 18.90 | 1.9 | 0.64960 | 0.68018 |
| 7 | 80.5171 | 0.2001 | | | | | |
| 8 | −93.4276 | 2.7476 | 1.75500 | 52.32 | 4.9 | 0.54765 | 0.63230 |
| 9 | −8.6961 | 0.2136 | | | | | |
| *10 | 7.4861 | 3.4876 | 1.69930 | 51.11 | −1.2 | 0.55523 | 0.63793 |
| *11 | −43.0083 | 1.0000 | | | | | |
| *12 | −12.5249 | 1.0001 | 1.90682 | 21.17 | 3.2 | 0.63332 | 0.66757 |
| 13 | 184.5917 | 0.3000 | | | | | |
| 14 | ∞ | 0.7000 | 1.51680 | 64.20 | 2.7 | 0.53430 | 0.63818 |
| 15 | ∞ | 1.6500 | | | | | |
| 16 | ∞ | 0.4000 | 1.51680 | 64.20 | 2.7 | 0.53430 | 0.63818 |
| 17 | ∞ | 3.5223 | | | | | |

TABLE 10

Example 4•Specification (d LINE)

| | |
|---|---|
| f | 6.49 |
| Bf | 6.20 |
| FNo. | 1.70 |
| 2ω[°] | 76.0 |

TABLE 11

Example 4•Aspherical Coefficient

| | Surface Number | | | | |
|---|---|---|---|---|---|
| | 3 | 4 | 10 | 11 | 12 |
| KA | −9.8322400E+00 | −7.4617116E+00 | 5.3333753E−01 | 3.9815937E+00 | 9.9999923E+00 |
| A3 | 0.0000000E+00 | 0.0000000E+00 | 0.0000000E+00 | 0.0000000E+00 | 0.0000000E+00 |
| A4 | −1.4777353E−03 | −2.1156093E−03 | 5.0960892E−04 | −8.4889939E−04 | −1.5080767E−03 |
| A5 | −1.2658246E−04 | −1.1039353E−04 | −3.4819925E−05 | 1.8051915E−04 | −5.9796704E−05 |
| A6 | 2.3599678E−05 | 1.1268072E−04 | 2.2905800E−05 | −4.3570358E−05 | 4.6374258E−05 |
| A7 | −8.9051993E−06 | −6.4034224E−06 | 6.6641966E−06 | −2.2118771E−05 | 1.0736519E−05 |
| A8 | −7.6271113E−07 | −2.7950447E−06 | −1.1846613E−06 | 1.6768231E−05 | −4.9200041E−06 |
| A9 | 1.8142933E−08 | 1.9333518E−07 | −5.0135148E−08 | −6.0094406E−07 | −8.2700168E−07 |
| A10 | 6.7912799E−09 | 2.9289308E−08 | 2.0820502E−08 | −6.5083104E−07 | 1.1856753E−07 |

Figure 5:
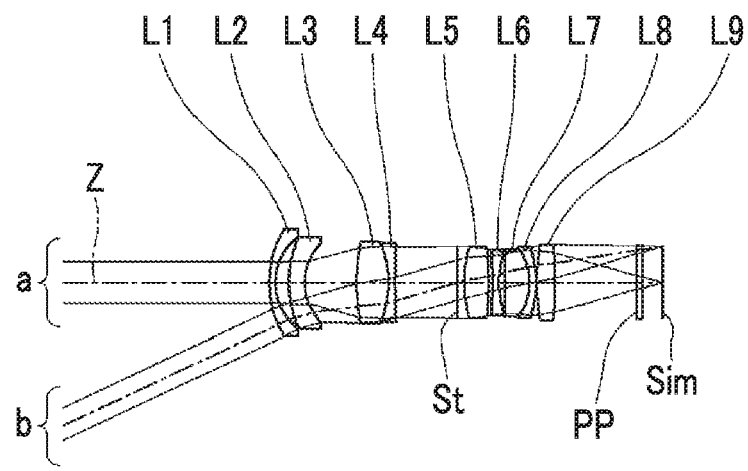
FIG. 5 is a cross-sectional view illustrating a lens configuration of an imaging lens of Example 5 of the present invention.
Figure 11:
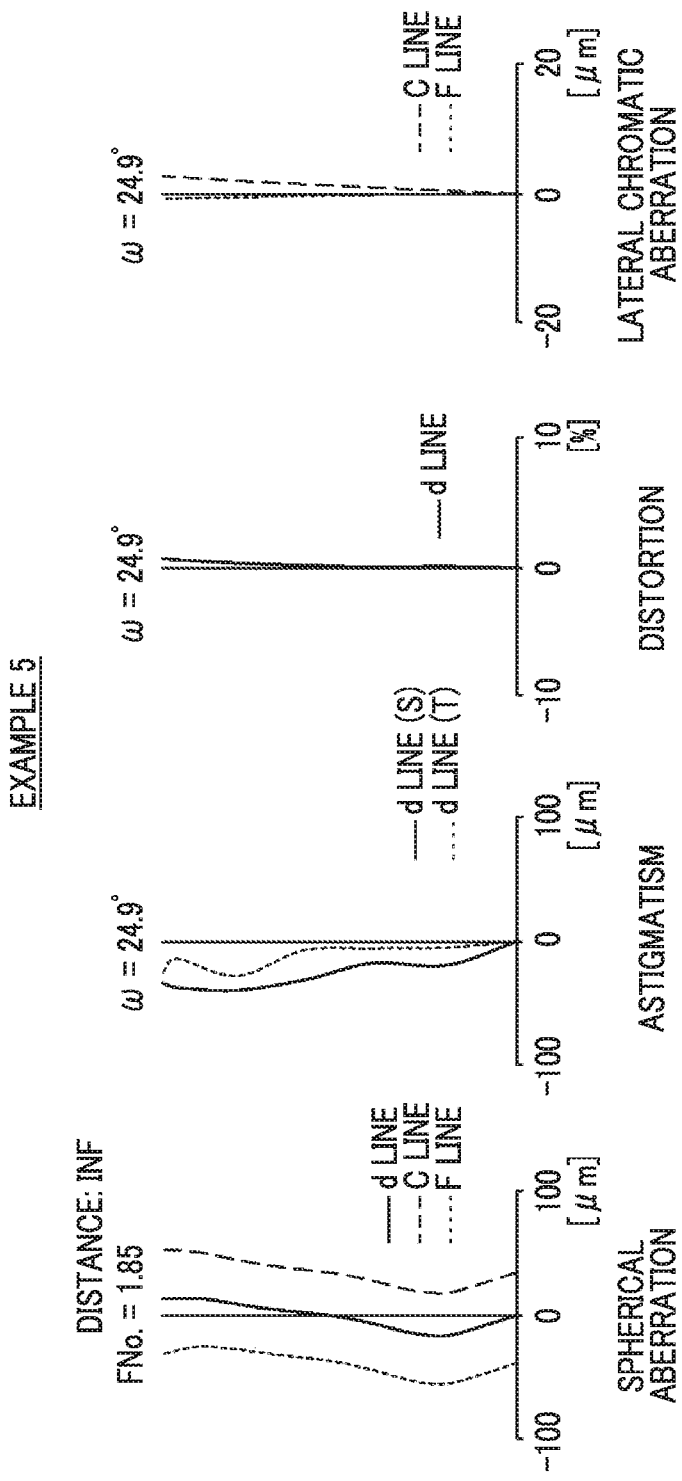
FIG. 11 is a diagram of aberrations of the imaging lens of Example 5 of the present invention.

Next, an imaging lens of Example 5 will be described. FIG. 5 shows a cross-sectional view illustrating a lens configuration of the imaging lens of Example 5. The imaging lens of Example 5 is composed of nine lenses, that is, lenses L1 to L9 in order from the object side. In the imaging lens of Example 5, the lens L5 (its material is S-LAL20 manufactured by OHARA INC.) is a positive lens that satisfies Conditional Expressions (1) to (3), and the lens L8 (its material is S-LAH52Q manufactured by OHARA INC.) is a negative lens that satisfies Conditional Expressions (7) to (9). In addition, Table 12 shows basic lens data of the imaging lens of Example 5, Table 13 shows data relating to specifications, Table 14 shows data relating to aspherical coefficients, and FIG. 11 shows a diagram of aberrations.

TABLE 12

Example 5•Lens Data (n and ν are based on d LINE)

| Surface Number | Curvature Radius | Surface Distance | n | ν | dn/dt | θgF | Conditional Expression (5) |
|---|---|---|---|---|---|---|---|
| 1 | 15.9916 | 0.9998 | 1.59551 | 39.24 | 2.1 | 0.58043 | 0.64392 |
| 2 | 9.1462 | 2.1860 | | | | | |
| *3 | 19.1908 | 2.5000 | 1.56867 | 58.27 | −2.6 | 0.55151 | 0.64579 |
| *4 | 8.2492 | 8.3919 | | | | | |
| 5 | 31.3899 | 5.1204 | 1.85150 | 40.78 | 5.4 | 0.56958 | 0.63556 |
| 6 | −15.8833 | 1.0098 | 1.51742 | 52.43 | 2.4 | 0.55649 | 0.64132 |
| 7 | 80.9349 | 10.0685 | | | | | |
| 8 (Stop) | ∞ | 1.0843 | | | | | |
| 9 | 19.1350 | 3.9659 | 1.69930 | 51.11 | −1.2 | 0.55523 | 0.63793 |
| 10 | −47.6524 | 0.6445 | | | | | |
| 11 | −58.8560 | 0.9998 | 1.84666 | 23.78 | 1.3 | 0.62054 | 0.65902 |
| 12 | 15.6119 | 1.0008 | | | | | |
| 13 | ∞ | 3.9399 | 1.65160 | 58.55 | 2.2 | 0.54267 | 0.63740 |
| 14 | −8.9850 | 0.9998 | 1.79952 | 42.24 | 10.2 | 0.56758 | 0.63592 |
| 15 | −18.4669 | 0.1000 | | | | | |
| 16 | 27.5306 | 2.9227 | 1.77250 | 49.60 | 4.4 | 0.55212 | 0.63237 |
| 17 | −73.4995 | 13.0000 | | | | | |
| 18 | ∞ | 1.0000 | 1.51633 | 64.14 | 2.7 | 0.53531 | 0.63909 |
| 19 | ∞ | 3.1789 | | | | | |

TABLE 13

Example 5•Specification (d LINE)

| | |
|---|---|
| f | 12.32 |
| Bf | 16.84 |
| FNo. | 1.85 |
| 2ω[°] | 49.8 |

TABLE 14

Example 5•Aspherical Coefficient

| | Surface Number | |
|---|---|---|
| | 3 | 4 |
| KA | 1.0000000E+00 | 1.0000000E+00 |
| A3 | 0.0000000E+00 | 0.0000000E+00 |
| A4 | 7.2299598E−05 | −4.4954565E−04 |
| A5 | 2.3642596E−05 | 6.0305732E−04 |
| A6 | −4.8252301E−06 | −2.9397739E−04 |
| A7 | −5.7184196E−07 | 3.5858875E−05 |
| A8 | 2.4702077E−07 | 1.7194254E−05 |
| A9 | −8.2909959E−09 | −5.7082924E−06 |
| A10 | −6.5912310E−09 | −8.7689308E−08 |
| A11 | 7.3598348E−10 | 2.3300229E−07 |
| A12 | 8.6480882E−11 | −1.5300831E−08 |
| A13 | −1.6826637E−11 | −4.6812644E−09 |
| A14 | −3.3615211E−13 | 4.9593338E−10 |

TABLE 14-continued

Example 5•Aspherical Coefficient

| | Surface Number | |
|---|---|---|
| | 3 | 4 |
| A15 | 1.9044946E−13 | 5.0898146E−11 |
| A16 | −4.2971275E−15 | −6.8219051E−12 |
| A17 | −1.0926420E−15 | −2.8762632E−13 |
| A18 | 5.1962793E−17 | 4.5048170E−14 |
| A19 | 2.5384292E−18 | 6.6354316E−16 |
| A20 | −1.6357577E−19 | −1.1683294E−16 |

Figure 6:
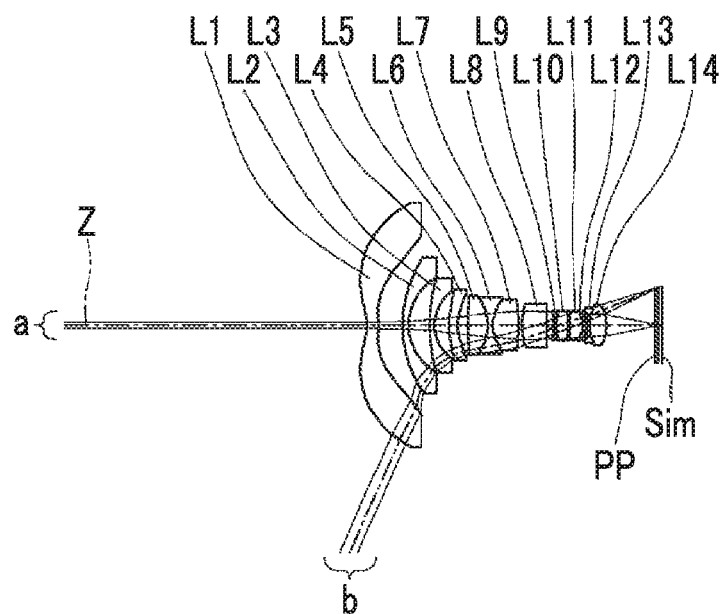
FIG. 6 is a cross-sectional view illustrating a lens configuration of an imaging lens of Example 6 of the present invention.
Figure 12:
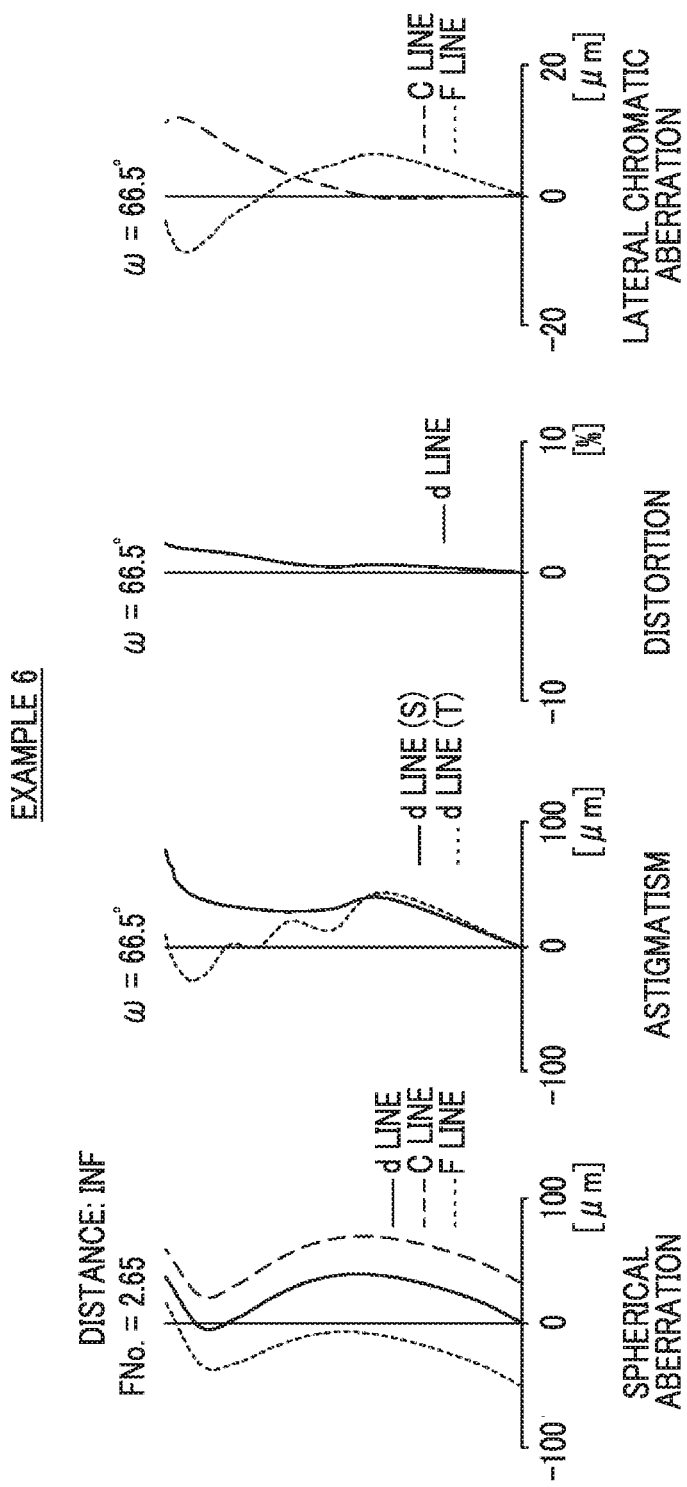
FIG. 12 is a diagram of aberrations of the imaging lens of Example 6 of the present invention.

Next, an imaging lens of Example 6 will be described. FIG. 6 shows a cross-sectional view illustrating a lens configuration of the imaging lens of Example 6. The imaging lens of Example 6 is composed of fourteen lenses, that is, lenses L1 to L14 in order from the object side. In the imaging lens of Example 6, the lens L8 (its material is S-LAL20 manufactured by OHARA INC.) is a positive lens that satisfies Conditional Expressions (1) to (3), and the lens L6 (its material is S-LAL54Q manufactured by OHARA INC.) and the lens L12 (its material is S-LAH52Q manufactured by OHARA INC.) are negative lenses that satisfy Conditional Expressions (7) to (9). In addition, Table 15 shows basic lens data of the imaging lens of Example 6, Table 16 shows data relating to specifications, Table 17 shows data relating to aspherical coefficients, and FIG. 12 shows a diagram of aberrations.

TABLE 15

Example 6•Lens Data (n and ν are based on d LINE)

| Surface Number | Curvature Radius | Surface Distance | n | ν | dn/dt | θgF | Conditional Expression (5) |
|---|---|---|---|---|---|---|---|
| *1 | −7.8855 | 3.4991 | 1.49100 | 57.58 | −118.7 | 0.56866 | 0.66182 |
| *2 | −15.7082 | 7.8359 | | | | | |
| 3 | 38.7384 | 1.9996 | 1.84666 | 23.78 | 1.3 | 0.62054 | 0.65902 |
| 4 | 17.7627 | 6.9204 | | | | | |
| 5 | 54.5221 | 1.6010 | 1.77250 | 49.60 | 4.4 | 0.55212 | 0.63237 |
| 6 | 13.4456 | 4.5759 | | | | | |
| *7 | 15.0165 | 3.0001 | 1.49100 | 57.58 | −118.7 | 0.56866 | 0.66182 |
| *8 | 13.2530 | 3.6053 | | | | | |
| 9 | 330.5359 | 6.3144 | 1.64769 | 33.79 | 2.3 | 0.59393 | 0.64860 |
| 10 | −14.5518 | 1.7097 | 1.65100 | 56.24 | 6.6 | 0.54210 | 0.63310 |
| 11 | 12.8559 | 8.4250 | 1.73800 | 32.26 | 5.5 | 0.58995 | 0.64215 |

TABLE 15-continued

Example 6•Lens Data (n and ν are based on d LINE)

| Surface Number | Curvature Radius | Surface Distance | n | ν | dn/dt | θgF | Conditional Expression (5) |
|---|---|---|---|---|---|---|---|
| 12 | −53.2441 | 1.2743 | | | | | |
| 13 | 28.5057 | 8.0108 | 1.69930 | 51.11 | −1.2 | 0.55523 | 0.63793 |
| 14 | 133.6876 | 2.1582 | | | | | |
| 15 | −34.3653 | 0.7991 | 1.80610 | 33.27 | 4.8 | 0.58845 | 0.64228 |
| 16 | 45.4631 | 0.2007 | | | | | |
| *17 | 14.2839 | 3.7545 | 1.58313 | 59.38 | 3.3 | 0.54237 | 0.63845 |
| *18 | −22.0126 | 0.4054 | | | | | |
| 19 | 90.2995 | 4.6660 | 1.48749 | 70.24 | −0.8 | 0.53007 | 0.64372 |
| 20 | −6.5844 | 0.9008 | 1.79952 | 42.24 | 10.2 | 0.56758 | 0.63592 |
| 21 | −10.6907 | 0.2010 | | | | | |
| 22 | −31.7114 | 1.0006 | 1.90366 | 31.31 | 3.6 | 0.59481 | 0.64547 |
| 23 | 14.8799 | 5.4997 | 1.48749 | 70.24 | −0.8 | 0.53007 | 0.64372 |
| 24 | −12.8766 | 15.9993 | | | | | |
| 25 | ∞ | 1.0500 | 1.51633 | 64.14 | 2.7 | 0.53531 | 0.63909 |
| 26 | ∞ | 0.0174 | | | | | |

TABLE 16

Example 6•Specification (d LINE)

| f | 5.37 |
|---|---|
| Bf | 17.82 |
| FNo. | 2.65 |
| 2ω[°] | 133.0 |

TABLE 17

Example 6•Aspherical Coefficient

| | Surface Number | |
|---|---|---|
| | 1 | 2 |
| KA | −1.1353739E+01 | −4.7521012E+01 |
| A3 | 2.7015145E−04 | 3.1695803E−03 |
| A4 | 3.6315144E−05 | −1.7507057E−04 |
| A5 | −1.4811327E−06 | −8.6186084E−07 |
| A6 | −3.6246965E−08 | 6.7902178E−07 |
| A7 | 2.4101578E−09 | −1.6254093E−08 |
| A8 | 6.0521122E−11 | −1.1794187E−09 |
| A9 | −5.5061103E−12 | 4.3046054E−11 |
| A10 | 7.6891085E−14 | 7.4724597E−13 |
| A11 | 1.4251095E−15 | −3.4611504E−14 |
| A12 | −3.0683757E−17 | −4.2394486E−16 |
| A13 | −2.8763973E−19 | 1.8522632E−17 |
| A14 | 2.6089820E−21 | 1.6085465E−19 |
| A15 | 1.7112773E−22 | −8.1524790E−21 |
| A16 | −1.9100521E−24 | 5.7761155E−23 |

| | Surface Number | |
|---|---|---|
| | 7 | 8 |
| KA | 1.0000000E+00 | 1.0000000E+00 |
| A3 | 0.0000000E+00 | 0.0000000E+00 |

TABLE 17-continued

Example 6•Aspherical Coefficient

| A4 | −3.2570416E−04 | −5.2025025E−04 |
|---|---|---|
| A5 | −5.5140525E−05 | 1.5746795E−04 |
| A6 | 1.9021298E−05 | −1.0717309E−04 |
| A7 | −1.2587306E−06 | 5.9363596E−05 |
| A8 | −2.7796991E−07 | −2.2643001E−05 |
| A9 | 4.8329754E−08 | 6.1348296E−06 |
| A10 | 5.0112832E−10 | −1.2133358E−06 |
| A11 | −5.8710504E−10 | 1.7754343E−07 |
| A12 | 2.6042922E−11 | −1.9211293E−08 |
| A13 | 2.8202492E−12 | 1.5158451E−09 |
| A14 | −2.4041393E−13 | −8.4701748E−11 |
| A15 | −1.9184457E−15 | 3.1798654E−12 |
| A16 | 6.4728433E−16 | −7.2268214E−14 |
| A17 | −1.5959817E−17 | 7.5563416E−16 |

| | Surface Number | |
|---|---|---|
| | 17 | 18 |
| KA | 1.0000000E+00 | 1.0000000E+00 |
| A4 | 8.9833592E−05 | 2.6508771E−04 |
| A6 | 2.6758071E−06 | 1.6486802E−06 |
| A8 | 2.8177072E−08 | 4.4248694E−08 |
| A10 | 4.9401051E−10 | 6.7046170E−10 |

Table 18 shows values corresponding to Conditional Expressions (1) to (11) of the imaging lens of Examples 1 to 6. Meanwhile, the d line is used as a reference wavelength in all the examples, and values shown in the following Table 18 are equivalent to those at this reference wavelength.

TABLE 18

| Expression Number | Conditional Expression | Example 1 | Example 2 | Example 3 | Example 4 | Example 5 | Example 6 |
|---|---|---|---|---|---|---|---|
| (1) | nP | 1.69930 | 1.69930 | 1.69930 | 1.69930 | 1.69930 | 1.69930 |
| (2) | νP | 51.11 | 51.11 | 51.11 | 51.11 | 51.11 | 51.11 |
| (3) | dnP/dt | −1.2 | −1.2 | −1.2 | −1.2 | −1.2 | −1.2 |
| (4) | νd | NONE | NONE | NONE | NONE | NONE | 70.24 |
| (5) | θgF + 0.001618 × νd | NONE | NONE | NONE | NONE | NONE | 0.6437 |
| (6) | fP/f | 2.19 | 2.28 | 2.49 | 1.45 | 1.62 | 9.35 |
| (7) | nN | 1.65100 | 1.65100 | 1.65100 | 1.65100 | 1.79952 | 1.65100 1.79952 |

TABLE 18-continued

| Expression Number | Conditional Expression | Example 1 | Example 2 | Example 3 | Example 4 | Example 5 | Example 6 |
|---|---|---|---|---|---|---|---|
| (8) | νN | 56.24 | 56.24 | 56.24 | 56.24 | 42.24 | 56.24 42.24 |
| (9) | dnN/dt | 6.6 | 6.6 | 6.6 | 6.6 | 10.2 | 6.6 10.2 |
| (10) | fN/f | −1.40 | −5.54 | −2.44 | −1.36 | −1.86 | −1.91 −4.42 |
| (11) | |HP/Hmax| | 0.72 | 1.00 | 0.91 | 0.99 | 0.99 | 1.00 |

From the above-mentioned data, it can be understood that, in a case where the imaging lenses of Examples 1 to 6 all satisfy Conditional Expressions (1) to (3) and (6) to (11), and include a lens that satisfies Conditional Expression (4), the lens that satisfies Conditional Expression (4) satisfies Conditional Expression (5), and is an imaging lens which is inexpensive in cost, and in which chromatic aberration and defocusing due to a change in temperature are satisfactorily corrected.

Figure 13:
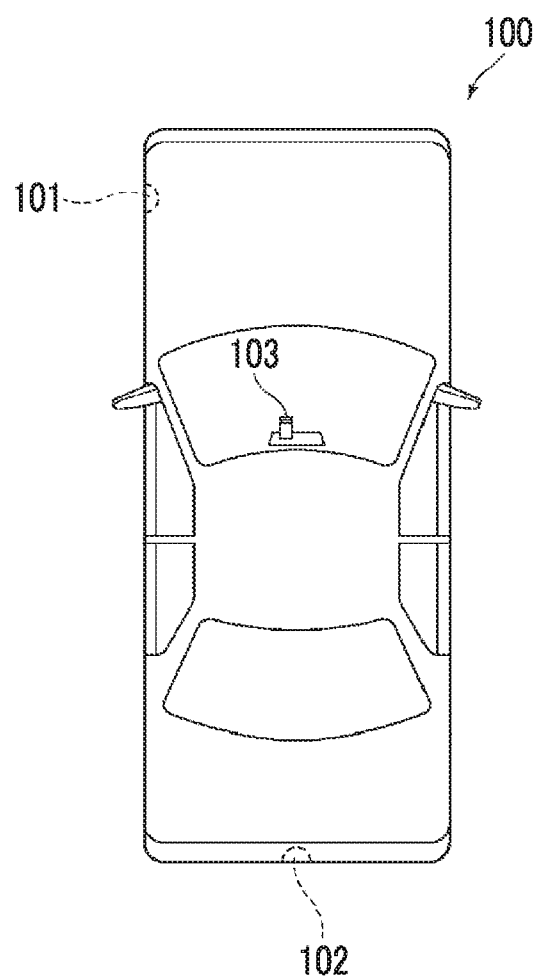
FIG. 13 is a schematic configuration diagram of an optical apparatus according to an embodiment of the present invention.

Next, an optical apparatus according to an embodiment of the present invention will be described. Here, a description will be given of an example in a case where the optical apparatus of the present invention is applied to an in-vehicle camera as an embodiment. FIG. 13 shows a state in which an in-vehicle camera is mounted in an automobile.

In FIG. 13, an automobile 100 includes an out-vehicle camera 101 for imaging a range of a blind spot on the lateral side of its passenger seat side, an out-vehicle camera 102 for imaging a range of a blind spot on the rear side of the automobile 100, and an in-vehicle camera 103, attached to the rear surface of its rearview mirror, for imaging the same range of a visual field as that of a driver. The out-vehicle camera 101, the out-vehicle camera 102, and the in-vehicle camera 103 are optical apparatuses, and include the imaging lens according to an embodiment of the present invention and an imaging element that converts an optical image formed by the imaging lens into an electrical signal. The vehicle-mounted cameras (out-vehicle cameras 101 and 102 and in-vehicle camera 103) of the present embodiment include the imaging lens of the present invention, and thus it is possible to have an inexpensive configuration, and to acquire a satisfactory image.

Figure 14:
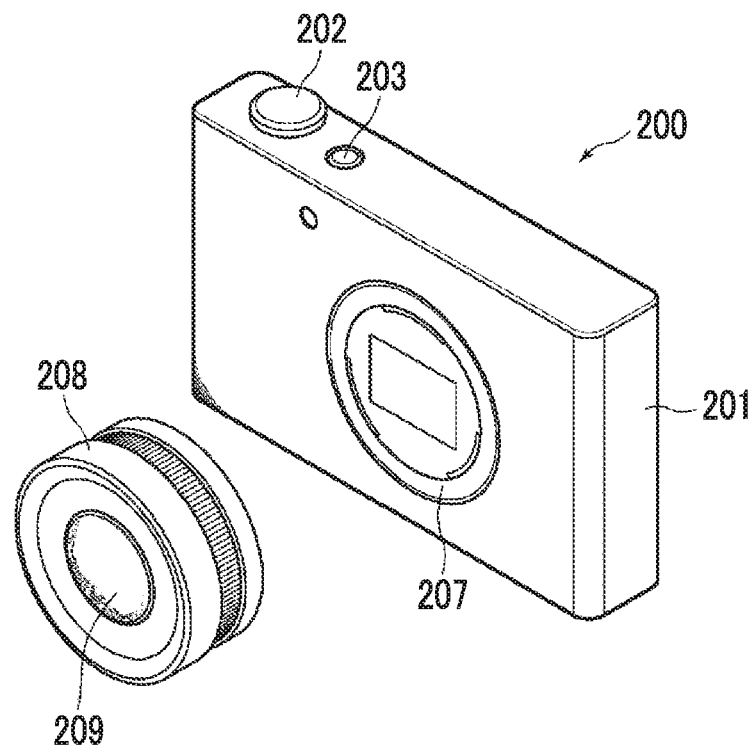
FIG. 14 is a perspective view illustrating a front side of an optical apparatus according to another embodiment of the present invention.
Figure 15:
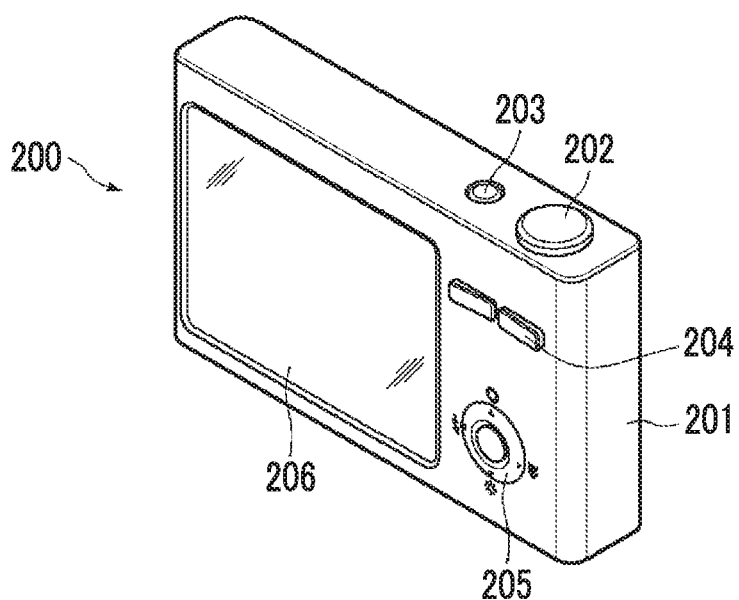
FIG. 15 is a perspective view illustrating a rear surface side of the optical apparatus of FIG. 14.

Next, an optical apparatus according to another embodiment of the present invention will be described with reference to FIGS. 14 and 15. A camera 200 showing perspective shapes of a front side and a rear surface side, respectively, in FIGS. 14 and 15 is a single-lens digital camera, having no reflex finder, which has an interchangeable lens 208 detachably mounted therein. The interchangeable lens 208 has an imaging lens 209 which is an optical system according to an embodiment of the present invention housed within a lens barrel.

This camera 200 includes a camera body 201, and is provided with a shutter button 202 and a power button 203 on the upper surface of the camera body 201. In addition, operating portions 204 and 205 and a display portion 206 are provided on the rear surface of the camera body 201. The display portion 206 is used for displaying a captured image or an image within an angle of view before image capture.

An imaging aperture on which light from an imaging target is incident is provided on the front central portion of the camera body 201, a mount 207 is provided at a position corresponding to the imaging aperture, and the interchangeable lens 208 is mounted onto the camera body 201 through this mount 207.

The camera body 201 is provided therein with an imaging element (not shown) such as a charge coupled device (CCD) or a complementary metal oxide semiconductor (CMOS) that outputs an imaging signal according to a subject image formed by the interchangeable lens 208, a signal processing circuit that processes the imaging signal which is output from the imaging element to generate an image, a recording medium for recording the generated image, and the like. In this camera 200, a still image or a motion picture can be captured by pressing the shutter button 202, and image data obtained by this image capture is recorded in the recording medium.

Hereinbefore, the present invention has been described through embodiments and examples, but the present invention is not limited to the above-described embodiments and examples, and can be variously modified. For example, values such as the curvature radius, the surface distance, the refractive index, and the Abbe number of each lens are not limited to the values shown in each of the above-described examples, and other values can be used therefor.

In addition, in the embodiment of the optical apparatus, an in-vehicle camera and a non-reflex type digital camera have been described by way of example with reference to the drawings, but the optical apparatus of the present invention is not limited thereto, and the present invention can also be applied to an optical apparatus such as, for example, a video camera, a digital camera other than a non-reflex type, a motion-picture camera, or a broadcast camera. Further, the optical apparatus including the imaging lens of the present invention may be applied to any apparatuses such as a projector without being limited to the cameras as described above.

EXPLANATION OF REFERENCES

100: automobile
101, 102: out-vehicle camera
103: in-vehicle camera
200: camera
201: camera body
202: shutter button
203: power button
204, 205: operating portion
206: display portion
207: mount
208: interchangeable lens
209: imaging lens
L1 to L14: lens
PP: optical member
Sim: image surface
St: aperture stop
a: on-axis light flux
b: light flux of maximum angle of view
Z: optical axis

What is claimed is:

1. An imaging lens in which a plurality of lenses are combined with each other, comprising:

at least one positive lens that satisfies the following Conditional Expressions (1) to (3) in a case where a refractive index at a d line of a positive lens included in the imaging lens is set to nP, an Abbe number at the d line of the positive lens is set to vP, and a rate of change of the refractive index at the d line of the positive lens with respect to a change in temperature at 25° C. is set to dnP/dt, $$1.65 < nP < 1.75 \quad (1)$$

$$45 < vP < 55 \quad (2)$$

$$dnP/dt < 0 \times 10^{-6}/° C. \quad (3)$$

wherein in a case where a lens that satisfies the following Conditional Expression (4) is included, the lens that satisfies the following Conditional Expression (4) satisfies the following Conditional Expression (5) in a case where an Abbe number at the d line of a lens included in the imaging lens is set to vd, and a partial dispersion ratio of the lens included in the imaging lens is set to θgF, $$60 < vd \quad (4)$$

$$0.6 < θgF + 0.001618 \times vd < 0.644 \quad (5), \text{ and}$$

wherein the following Conditional Expression (11) is satisfied in a case where a maximum value of heights of a paraxial on-axis light ray on each lens surface of the positive lens that satisfies Conditional Expressions (1) to (3) is set to HP, and a maximum value of heights of a paraxial on-axis light ray on each lens surface of all lenses included in the imaging lens is set to Hmax, $$0.5 < |HP/H\text{max}| \quad (11).$$

2. The imaging lens according to claim 1, wherein the positive lens that satisfies Conditional Expressions (1) to (3) satisfies the following Conditional Expression (6) in a case where a focal length of the positive lens is set to fP, and a focal length of the whole system during focusing on an infinite object is set to f, $$1 < fP/f < 15 \quad (6).$$

3. The imaging lens according to claim 2, wherein the positive lens that satisfies Conditional Expressions (1) to (3) satisfies the following Conditional Expression (6-1), $$1.2 < fP/f < 12 \quad (6-1).$$

4. The imaging lens according to claim 1, further comprising:

at least one negative lens that satisfies the following Conditional Expressions (7) to (9) in a case where a refractive index at the d line of a negative lens included in the imaging lens is set to nN, an Abbe number at the d line of the negative lens is set to vN, and a rate of change of the refractive index at the d line of the negative lens with respect to a change in temperature at 25° C. is set to dnN/dt, $$1.6 < nN < 1.85 \quad (7)$$

$$40 < vN < 60 \quad (8)$$

$$6 \times 10^{-6}/° C. < dnN/dt \quad (9).$$

5. The imaging lens according to claim 4, wherein the negative lens that satisfies Conditional Expressions (7) to (9) satisfies the following Conditional Expression (10) in a case where a focal length of the negative lens is set to fN, and a focal length of the whole system during focusing on an infinite object is set to f, $$-10 < fN/f < -0.5 \quad (10).$$

6. The imaging lens according to claim 5, wherein the negative lens that satisfies Conditional Expressions (7) to (9) satisfies the following Conditional Expression (10-1), $$-7 < fN/f < -1 \quad (10-1).$$

7. The imaging lens according to claim 4, wherein the negative lens that satisfies Conditional Expressions (7) to (9) satisfies the following Conditional Expression (7-1), $$1.65 < nN < 1.8 \quad (7-1).$$

8. The imaging lens according to claim 4, wherein the negative lens that satisfies Conditional Expressions (7) to (9) satisfies the following Conditional Expression (8-1), $$42 < vN < 57 \quad (8-1).$$

9. The imaging lens according to claim 4, wherein the negative lens that satisfies Conditional Expressions (7) to (9) satisfies the following Conditional Expression (9-1), $$6.5 \times 10^{-6}/° C. < dnN/dt < 11 \times 10^{-6}/° C. \quad (9-1).$$

10. The imaging lens according to claim 1, wherein the positive lens that satisfies Conditional Expressions (1) to (3) satisfies the following Conditional Expression (1-1), $$1.69 < nP < 1.71 \quad (1-1).$$

11. The imaging lens according to claim 1, wherein the positive lens that satisfies Conditional Expressions (1) to (3) satisfies the following Conditional Expression (2-1), $$50 < vP < 52 \quad (2-1).$$

12. The imaging lens according to claim 1, wherein the positive lens that satisfies Conditional Expressions (1) to (3) satisfies the following Conditional Expression (3-1), $$-2 \times 10^{-6}/° C. < dnP/dt < -1 \times 10^{-6}/° C. \quad (3-1).$$

13. The imaging lens according to claim 1, wherein in a case where a lens that satisfies the following Conditional Expression (4-1) is included, the lens that satisfies the following Conditional Expression (4-1) satisfies the Conditional Expression (5), $$60 < vd < 75 \quad (4-1).$$

14. The imaging lens according to claim 1, wherein the following Conditional Expression (11-1) is satisfied, $$0.65 < |Hp/H\text{max}| \le 1 \quad (11-1).$$

15. An optical apparatus comprising the imaging lens according to claim 1.

* * * * *